Feb. 15, 1966  C. W. MacMILLAN  3,234,656
PROCESS OF AND APPARATUS FOR DETERMINING THE STEERING
AXIS INCLINATION OF AUTOMOBILE WHEELS
Filed Oct. 30, 1962  2 Sheets-Sheet 1
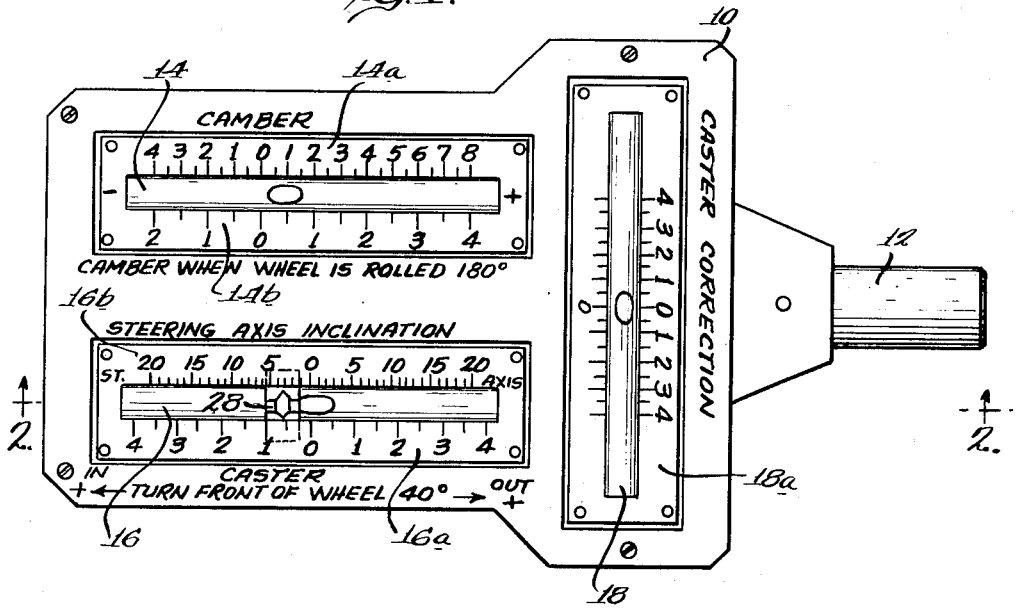
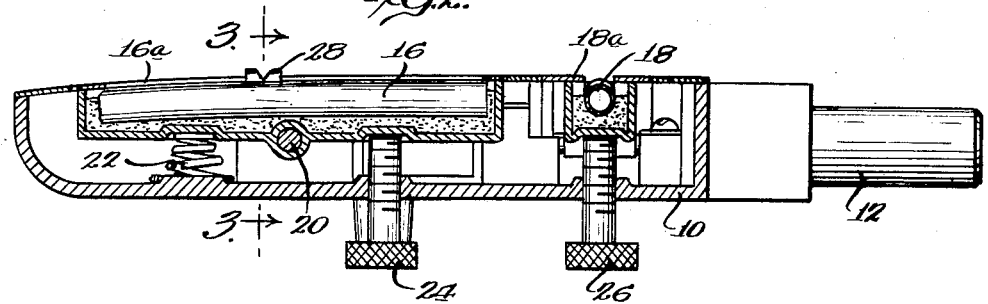
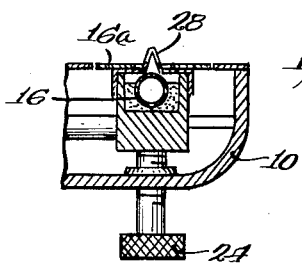
INVENTOR.
Charles W. MacMillan
BY
Gary, Desmond & Parker
Attys Feb. 15, 1966 C. W. MacMILLAN 3,234,656
PROCESS OF AND APPARATUS FOR DETERMINING THE STEERING
AXIS INCLINATION OF AUTOMOBILE WHEELS
Filed Oct. 30, 1962 2 Sheets-Sheet 2
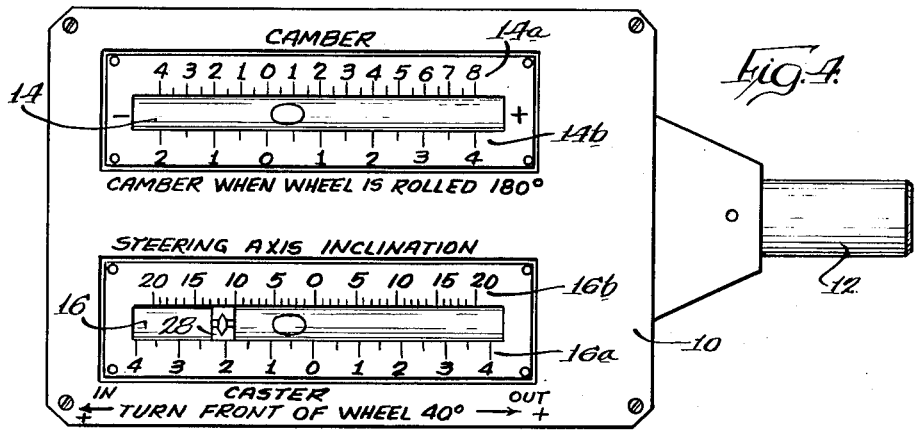
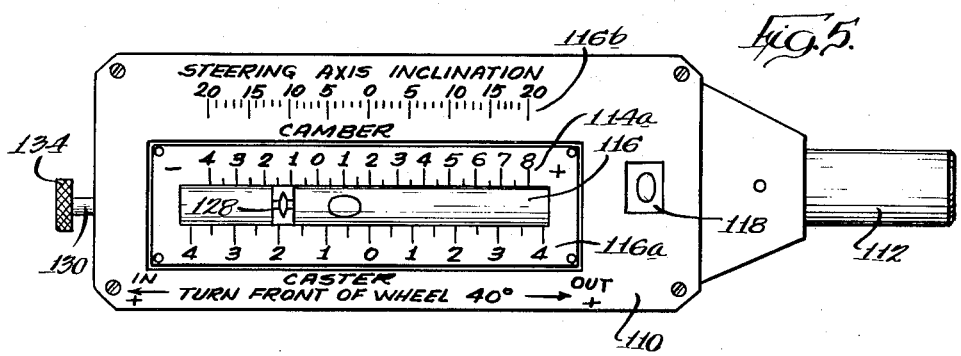
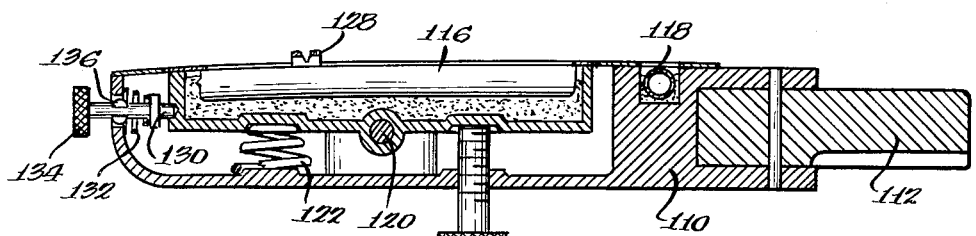
INVENTOR:
Charles W. MacMillan
BY
Gary, Desmond & Parker
Attys United States Patent Office 3,234,656
Patented Feb. 15, 1966

3,234,656
PROCESS OF AND APPARATUS FOR DETERMINING THE STEERING AXIS INCLINATION OF AUTOMOBILE WHEELS
Charles W. MacMillan, Rock Island, Ill., assignor to Bear Manufacturing Company, Rock Island, Ill., a corporation of Delaware
Filed Oct. 30, 1962, Ser. No. 234,106
5 Claims. (Cl. 33—203.18)

The present invention relates to a new process of determining the steering axis inclination of the steering wheels of automotive vehicles, and to improved means for determining the caster, camber and steering axis inclination of such wheels.

Heretofore, the steering axis or kingpin inclination of the steering wheels of automotive vehicles has been determined primarily by measurement of the vertical angle through which the wheel tilts in its own plane when swung in a horizontal arc from a predetermined position to one side of its straight ahead position to the corresponding position to the opposite side of its straight ahead position, e.g., from 20 degrees in to 20 degrees out from its straight ahead position. Such measurement has conventionally been effected by a spirit level mounted on the wheel in a generally horizontal position parallel to the wheel; by a pendulum device mounted on the wheel for swinging movement in a plane parallel to the wheel; by a lightbeam projector mounted in a horizontal position parallel to the wheel and projecting a beam of light on a vertically graduated scale; and by other devices well known in the art.

The disadvantage of the described system of measuring steering axis inclination is that the same is subject to error due to rotation of the wheel about its spindle as the wheel is swung through the horizontal arc producing rise and fall of the wheel. Consequently, it has been necessary to lock the wheels against rotation when measuring steering axis or kingpin inclination, especially by applying the vehicle brakes. The brakes may be applied by one mechanic while another takes the measurements, which is a waste of manpower and expensive; or the brakes may be applied by means of a mechanical brake pedal depressor installed by a single mechanic who thereafter takes the measurement, which still involves loss of time and expense. And even with this precaution, error is still inherent in the measurement since the wheel may roll due to loose brake anchor bolts and/or play in the brake system.

One object of the present invention is to provide an improved process of measuring steering axis inclination eliminating the disadvantages and errors inherent in the prior system, and facilitating accurate measurement in a convenient manner.

Another object of the invention is to provide an improved process of measuring steering axis or kingpin inclination wherein rolling of the wheel does not introduce any error into the measurement, thereby eliminating the source of error in the prior system and also eliminating the necessity for application of the brakes when taking the measurement.

Specifically, it is the object of the present invention to provide an improved process of measuring steering axis inclination characterized by adding algebraically the changes in the inclination of the plane of the wheel to vertical when the wheel is swung is opposite directions through two equal arcs to opposite sides of the straight ahead position of the wheel.

Since the measurement taken according to this invention is the inclination of the plane of the wheel to vertical, any means conventionally employed for measuring wheel caster may be utilized to effect the required measurements, such for example, as a spirit level mounted on the wheel in a horizontal position generally transverse to the plane of the wheel or a pendulum mounted on the wheel to swing in a vertical plane perpendicular to the plane of the wheel.

Consequently, a particular object of this invention is the provision of an improved process of measuring steering axis inclination with adjustable gauge means of the character above described, comprising the steps of swinging the wheel in one direction through a predetermined arc to one side of the straight ahead position of the wheel, setting the gauge means to zero at the start of said swing and reading the gauge means at the end of said swing, swinging the wheel in the opposite direction through an equal arc to the other side of the straight ahead position of the wheel, setting the gauge means at the start of the latter swing to the reading taken at the end of the first swing, and reading from the gauge means at the end of said latter swing the steering axis inclination of the wheel.

Pursuant to the above description, the wheel may be swung in one direction from the straight ahead position through a predetermined number of degrees for its first arcuate swing, returned to straight ahead position, and then swung in the other direction from the straight ahead position through the same predetermined number of degrees for its second or "said latter" swing. Alternatively, the wheel may be moved to a first position a predetermined number of degrees to one side of its straight ahead position and then swung from that position to its straight ahead position for its said first swing, then moved to a third position the same number of degrees to the other side of its straight ahead position, and finally swung from said third position back to its straight ahead position for its said latter swing.

In conjunction with the last described sequence of wheel movement, it is an object of the invention to provide an improved process of simultaneously measuring wheel caster and steering axis inclination comprising the steps of moving the wheel to the "first" position described in the preceding paragraph and setting both caster gauge means and steering axis inclination gauge means to zero, swinging the wheel to a "second," straight ahead position and reading the steering axis inclination gauge means, swinging the wheel to the above defined "third" position, reading wheel caster from the caster gauge means and setting the steering axis inclination gauge means to the reading taken in said second position while the wheel is in said third position, swinging the wheel back to a "fourth," straight ahead position, and reading steering axis inclination from the steering axis inclination gauge means while the wheel is in said fourth position.

A further object of the invention, correlated to the process described in the immediately preceding paragraph, is the provision of improved wheel alinement apparatus characterized by gauge means having means, such as a spirit level, for indicating inclination of the plane of the wheel to vertical, and including caster and steering axis inclination scales having a common zero associated with said means to facilitate performance of the described process.

Other objects and advantages of the invention will become apparent in the following detailed description.

Now, in order to acquaint those skilled in the art with the manner of practicing my process, and of making and using my improved apparatus, I shall described, in connection with the accompanying drawings, preferred embodiments of my apparatus and the preferred manners of making and using the same.

In the drawings, wherein like reference numerals indicate like parts:

FIGURE 1 is a plan view of a wheel alinement gauge of the character disclosed in my copending application, Serial No. 81,762, filed January 10, 1961, now Patent No. 3,071,863, as revised pursuant to the present invention;

FIGURE 2 is a vertical section taken substantially on line 2—2 of FIGURE 1;

FIGURE 3 is a fragmentary cross-sectional view taken substantially on line 3—3 of FIGURE 2;

FIGURE 4 is a view similar to FIGURE 1 showing a modified form of gauge;

FIGURE 5 is plan view of a very simple form of spirit level gauge provided pursuant to this invention; and FIGURE 6 is a vertical section of the gauge of FIGURE 5.

Referring now to the drawings and particularly to FIGURES 1 to 3, the gauge there illustrated is, with a single exception, identical to the gauge of my Patent 3,071,863 to which reference is made for a detailed description of the construction of the gauge. In brief, the gauge comprises a body 10 having a shank 12 to which an adapter (not shown) may be secured to facilitate mounting of the gauge on the steering wheels of automotive vehicles. The adapter may be of a type to mount the body 10 perpendicular to the plane of the wheel with the shank 12 thereof substantially coaxial with the wheel spindle. Alternatively, the adapter may be of a variety including a ball and socket joint adjustably mounting the body 10 on the wheel in a generally horizontal position transverse to the plane of the wheel. Adapters of both types are shown in said Patent 3,071,863.

The body 10 mounts three spirit levels, namely, a first spirit level 14 fixed in the body parallel to the shank 12; a second spirit level 16 mounted in the body parallel to the shank 12 and the level 14; and a third spirit level 18 mounted in the body transversely of the levels 14 and 16 and thus located for disposition parallel to the wheel. The levels 16 and 18 are both mounted in the body for pivotal adjustment about respective axes extending transversely thereof. As shown in FIGURE 2, the level 16 is pivotally mounted intermediate its ends on a transverse shaft 20. A compression spring 22 normally biases one end of the level upwardly, whereby the other end is biased downwardly against an adjusting screw 24 threaded through the lower wall of the body and having a manually engageable head at its lower end. The level 18 is similarly mounted and equipped with an adjusting screw 26.

As explained in said patent, the level 14 is adapted for measuring the wheel camber and is equipped with camber scales 14a and 14b. If the gauge is fixed perpendicular to the plane of the wheel by an appropriate form of adapter, such as a magnetic adapter, wheel camber may be read directly from the scale 14a, when the wheel is positioned in its straight ahead position, by noting the location of the center of the bubble in the level 14 relative to that scale. If an adjustable adapter is used, the gauge will be turned upside down and centered in a perfectly horizontal position by means of a spherical leveling vial (not shown) located in the base wall of the body 10; the wheel will then be rolled through one-half rotation (180 degrees); and the camber will be read on the scale 14b.

The level 16 is adapted for measuring wheel caster and is equipped with a caster scale 16a. To measure caster, the gauge is mounted on the wheel with the level 16 generally perpendicular to the plane of the wheel; the wheel is swung a predetermined number of degrees to one side of its straight ahead position, for example 20 degrees inwardly from said position; the level 16 is adjusted by screw 24 until the bubble of the level is centered on the zero of the scale 16a; the wheel is swung to a position an equal number of degrees to the opposite side of its straight ahead position, i.e., 20 degrees outwardly from straight ahead; and caster is then read from the scale 16a at the location opposite the center of the bubble in the level 16.

In accordance with the prior practice of the art, steering axis or kingpin inclination has been determined by disposing the level 18 generally horizontal and parallel to the plane of the wheel and manipulating the level 18 by the screw 26 in the same manner and through the same wheel movements as described above in connection with caster measurement, steering axis inclination being read from an appropriate scale located in the position of the illustrated scale 18a. Obviously, both caster and steering axis inclination can be measured at the same time by appropriate use of the levels 16 and 18.

As previously explained, the steering axis inclination reading is subject to error due to rolling of the wheel when swinging the same through the 40 degree arc selected as the test angle. While I will refer herein to a 40 degree measuring arc extending from an inward to an outward position, it will be apparent that the swing may be effected over a different angle and/or from out to in upon proper calibration of the scales, all as is well-known to those skilled in the art.

The present invention provides a new process of measuring steering axis inclination that is not subject to the inherent errors of the prior practice, and that utilizes the caster level 16, rather than the level 18, in effecting such measurement. While I will hereinafter describe practice of my new process in relation to spirit level gauges, those skilled in the art will immediately recognize the applicability of the invention to other forms of wheel alinement apparatus, such as the pendulum and projected lightbeam types.

According to the invention, the level 16 is provided to one side thereof with the usual caster scale 16a and to the other side thereof with an appropriately calibrated steering axis inclination scale 16b, which preferably has its zero alined with the zero on the caster scale. Also, though it is not essential to the invention, I prefer to provide the scale 16 with an adjustable marker in the form of a longitudinally reciprocable slider 28. The slider may suitably comprise a thin sheet metal member of inverted U-shape slidably mounted on the body of the level 16 below the scale plate thereof and having an arrow or pointer exposed through the scale plate slot for cooperative use with the scale 16b.

In practicing the process, the gauge 10 is mounted on the wheel in the conventional manner, i.e., with the body 10 generally horizontal and the levels 14 and 16 extending transversely of the plane of the wheel. My process of determining steering axis inclination involves measurement of the change in wheel camber, i.e., the inclination of the plane of the wheel to vertical, occurring over two equal angles to opposite sides of the straight ahead position of the wheel when the wheel is swung in opposite directions through the two angles. This may be accomplished by swinging the wheel from each of two predetermined positions to opposite sides of the straight ahead position of the wheel toward the latter position, or by swinging the wheel from its straight ahead position toward each of the former positions. While there may be variations in the starting and ending positions and the arc of the swing selected for effecting the measurement, there are essentially two manners of making the measurement.

According to one mode of operation, the wheel would initially be disposed in a first, straight ahead position and the level 16 would be adjusted by the screw 24 until the bubble was disposed with its center opposite the zero point on the scale 16b. The wheel would then be swung either inwardly or outwardly to a predetermined position to one side of straight ahead, say 20 degrees to one side thereof, and the position of the bubble relative to the scale 16b would be marked. It is at this point that the slider 28 is of value, in that the same may be moved to aline its arrow or pointer with the center of the bubble whereby there is no need to remember or jot down the reading of the level in the second position of the wheel. The wheel is then returned to its straight ahead position, which comprises a third wheel position in the sequence, wherein the level 16 is adjusted to dispose the bubble at the location marked in said second position, i.e., to aline the bubble with the arrow of the slider 28. The wheel is then swung to the opposite side of its straight ahead position to a fourth position corresponding to said second position (but to the opposite side of straight ahead), in which fourth position the steering axis inclination of the wheel is indicated by the location of the spirit level bubble relative to the scale 16b.

The effect of the setting the spirit level in sequence defined is to add together algebraically the changes in wheel inclination occurring over the two arcs, whereby to ascertain steering axis inclination directly from the gauge. To add together algebrically means to take into account the negative and positive signs of the two changes measured, i.e. to add changes of the same sign and to subtract changes of opposite sign. This addition could of course be made manually by algebraic addition of the two readings taken at the second and fourth positions following setting of the level to zero at both the first and third positions. However, it is more convenient to operate the spirit level as above defined so that it effects the addition.

According to the second and preferred mode of operation under the process of the invention, the wheel is initially disposed in a predetermined first position to one side of straight ahead, e.g., 20 degrees inwardly from straight ahead, wherein the level 16 is adjusted by the screw 24 to the zero position on both of the scales 16a and 16b. The wheel is then swung to a straight ahead second position wherein the location of the bubble relative to the steering axis inclination scale 16b is read, and preferably marked by appropriate positioning of the slider 28. The wheel is then swung to the opposite side of straight ahead through the same arcuate distance, i.e., 20 degrees outwardly from straight ahead in the example given, to a third position. The movement of the wheel thus far, except for the momentary stopping at the straight ahead second position, is the movement customarily employed in measuring caster, whereby wheel caster may be read from the scale 16a when the wheel is in its third position. Thus, the presently described mode of operation, together with location of the scales 16a and 16b with the zeros, aligned, facilitates simultaneous measurement of caster and steering axis inclination. After the caster reading has been taken, the level 16 is adjusted by screw 24 to locate the bubble at the reading marked in said second position, that is, to aline the bubble with the marker 28. The wheel is swung back to a straight ahead fourth position, wherein steering axis inclination may be read from scale 16b.

Since in both modes of operation pursuant to this invention the level 16 is disposed generally perpendicular to the wheel, rolling of the wheel about its spindle during the test will not introduce any error into the measurement taken. Consequently, the prior art necessity for applying the brakes is eliminated and the measurement is completely accurate.

With the gauge illustrated in FIGURES 1 to 3, the level 18 may still be employed as a means for indicating caster correction as corrections in caster are being effected. However, the level is no longer necessary for testing purposes and may, if desired, be dispensed with. The result is the gauge illustrated in FIGURE 4, which is identical to the gauge above described (as indicated by use of the same reference numerals) with the exception that the level 18 and its adjusting means 26 are eliminated. Consequently, the gauge is considerably more economical in construction and more compact in size, yet affords all the testing capabilities of the gauge shown in FIGURES 1 to 3.

The ultimate in gauge compactness is shown in FIGURES 5 and 6 wherein the instrument has been reduced to a single level 116 adjustably mounted in a body 110 having an adapter shank 112, the same as previously described. Associated with the level are a camber scale 114a, which may comprise scale means identical to either or both of the scales 14a and 14b, a caster scale 116a and a steering axis inclination scale 116b. While not essential, a transverse leveling vial 118 may be provided if desired. As shown in FIGURE 6, the level 116 is pivotally mounted intermediate its ends on a shaft 120, a spring 133 normally biases one end of the level upwardly and a thumbscrew 124 is provided adjacent the opposite end of the level for adjusting the same. Preferably, a slidable marker 128 is associated with the level.

In this embodiment of the invention, the level 116, since it is intended for camber measurement, is provided with means for selectively locking the same in the body parallel to the shank 112 to facilitate camber measurement. To this end, the body of the level is provided at its rear with a socket adapted for reception of the inner end of a locating plunger 130. The plunger 130 is slidably mounted in the rear wall of the gauge body 110 and is normally biased into engagement with the level by a compression spring 132 confined between the body and a collar on the plunger. At its outer end, the plunger carries a manipulating knob 134, and at its point of passage through the body 110 is provided with radially upset portions 136. The body 110 has a vertical slot in its rear wall accommodating passage of the plunger 130 and the upset portions 136 when the latter are disposed vertically, whereby the plunger may engage in its socket to locate the level for measurement of camber. Thereafter, the plunger may be retracted and rotated 90 degrees., whereupon the upset portions 136 will retain the plunger retracted so that the level is freely adjustable for measurement of caster and steering axis inclination in the manners previously described.

From the foregoing, it will be appreciated that the present invention provides a new and improved process of measuring steering axis or kingpin inclination eliminating the disadvantages of prior practices of determining such inclination, and the errors inherent in measurements effected according to prior art practices. Also, the present invention provides improved and particularly simplified forms of wheel alinement apparatus. Consequently, all of the objects and advantages of the invention have been shown herein to be attained in a convenient, economical and practical manner.

While I have shown and described what I regard to be the preferred embodiments of the apparatus of my invention, and have described what I regard to be the preferred modes of practicing the process of my invention, it will be appreciated that various changes, rearrangements and modifications may be made therein without departing from the scope of the invention, as defined by the appended claims.

I claim:

1. A process of measuring the steering axis inclination of an automotive steering wheel by adjustable gauge means mounted on the wheel to measure the inclination of the plane of the wheel to vertical; comprising the steps of swinging the wheel in one direction through a predetermined arc to one side of the straight ahead position of the wheel, setting the gauge means to zero at the start of said swing to measure the change in the inclination of the plane of the wheel to vertical occurring during said swing, swinging the wheel in the opposite direction through an equal arc to the other side of the straight ahead position of the wheel, and setting the gauge means at the start of the latter swing to the measurement taken during the first swing to add algebraically to the change in wheel inclination occurring during said first swing the change in wheel inclination occurring during said latter swing.

2. A process as set forth in claim 1, wherein the wheel is swung in one direction from the straight ahead position through a predetermined number of degrees for its first arcuate swing, returned to straight ahead position, and then swung in the other direction from its straight ahead position through the same predetermined number of degrees for its said latter swing.

3. A process as set forth in claim 1, wherein the wheel is moved to a first position a predetermined number of degrees to one side of its straight ahead position and then swung from that position to its straight ahead position for its said first swing, then moved to a third position the same number of degrees to the other side of its straight ahead position, and finally swung from said third position back to its straight ahead position for its said latter swing.

4. A process of measuring the steering axis inclination and caster of an automotive steering wheel by adjustable gauge means mounted on the wheel to measure the inclination of the plane of the wheel to vertical and equipped with caster and steering axis inclination scales having a common zero; comprising the steps of swinging the wheel to a first position spaced a predetermined number of degrees in one direction from its straight ahead position, setting the gauge means to zero relative to both said scales in said first position, swinging the wheel to a straight ahead second position, marking the location of the gauge means relative to said steering axis inclination scale in said second position, swinging the wheel to a third position spaced said predetermined number of degrees in the other direction from its straight ahead position, reading the caster of the wheel from the caster scale in said third position, setting the gauge means while in said third position to the location on said steering axis inclination scale marked in said second position, swinging the wheel back to a straight ahead fourth position, and reading the steering axis inclination of the wheel from said steering axis inclination scale in said fourth position.

5. A gauge for determining the camber, caster and steering axis inclination of an automobile wheel comprising a gauge body to be mounted on the wheel with its axis transverse to the plane of the wheel, a spirit level mounted in said body parallel to the axis thereof, means for tiltably adjusting said spirit level about a horizontal axis transverse thereto, means on said body engageable with said spirit level in a predetermined position of tiltable adjustment of said level for releasably locking said spirit level to said body in said position for measuring camber, and camber, caster and steering axis inclination scales on said body paralleling said spirit level.

References Cited by the Examiner

UNITED STATES PATENTS

| | | | |
|---|---|---|---|
| 2,074,108 | 3/1937 | Graham | 33—203.18 |
| 2,577,841 | 12/1951 | Creagmile | 33—203.18 |
| 2,581,630 | 1/1952 | Carrigan | 33—203.18 |
| 2,627,123 | 2/1953 | Taber | 33—203.18 |
| 2,645,860 | 7/1953 | Bender et al. | 33—203.18 |
| 2,729,896 | 1/1956 | Rosenblum | 33—203.18 |
| 2,831,264 | 4/1958 | Weaver | 33—203.18 |
| 3,071,863 | 1/1963 | MacMillan | 33—203.18 |

FOREIGN PATENTS

| | | |
|---|---|---|
| 612,699 | 11/1948 | Great Britain. |
| 768,197 | 2/1957 | Great Britain. |
| 778,227 | 7/1957 | Great Britain. |

ROBERT B. HULL, *Primary Examiner.*

ISAAC LISANN, *Examiner.*